United States Patent

Ogasawara et al.

[11] Patent Number: 5,812,338
[45] Date of Patent: Sep. 22, 1998

[54] METHOD AND APPARATUS FOR INDICATING START OF SERVO INFORMATION ON A RECORDING MEDIUM

[75] Inventors: Kenji Ogasawara; Takashi Nakamura; Nobuya Matsubara, all of Fugisawa; Yuzo Nakagawa, Hiratsuka; Yuji Kigami; Hiroshi Uchiike, both of Yamato; Tsutomu Numata, Sagamihara, all of Japan

[73] Assignee: International Business Machines Corporation, Armonk, N.Y.

[21] Appl. No.: 649,578

[22] Filed: May 17, 1996

[30] Foreign Application Priority Data

Jul. 26, 1995 [JP] Japan .................................. 7-190109

[51] Int. Cl.$^6$ .................................................. G11B 5/596
[52] U.S. Cl. ............................. 360/77.08; 360/48; 360/53
[58] Field of Search .................................. 360/48, 49, 51, 360/53, 77.08, 77.07

[56] References Cited

U.S. PATENT DOCUMENTS

| | | | |
|---|---|---|---|
| 5,231,545 | 6/1993 | Gold | 360/49 |
| 5,237,552 | 8/1993 | Masood et al. | 360/49 X |
| 5,293,276 | 3/1994 | Dunn et al. | 360/49 X |
| 5,442,499 | 8/1995 | Emori | 360/77.08 |
| 5,477,103 | 12/1995 | Romano et al. | 360/77.08 X |
| 5,600,499 | 2/1997 | Acosta et al. | 360/49 X |

*Primary Examiner*—Aristotelis M. Psitos
*Assistant Examiner*—Larry T. Cullen
*Attorney, Agent, or Firm*—Merchant, Gould, Smith, Edell, Welter & Schmidt; Pryor A. Garnett

[57] ABSTRACT

A disk and a disk drive having a servo start mark for identifying a servo-information start position recorded on the disk is provided. The servo start mark has a plurality of bit patterns unused for other areas in servo information. A method for identifying the position of a signal transducer on a disk is also provided in which it is judged that the signal transducer is present at a predetermined position even if an error is present and the error is a one-bit error. This is accomplished by assuming that the position is correct when the following conditions are confirmed: (a) a parity error occurs in a read servo-information bit pattern and (b) read servo-information bit pattern does not coincide with servo information of an adjacent track.

2 Claims, 8 Drawing Sheets

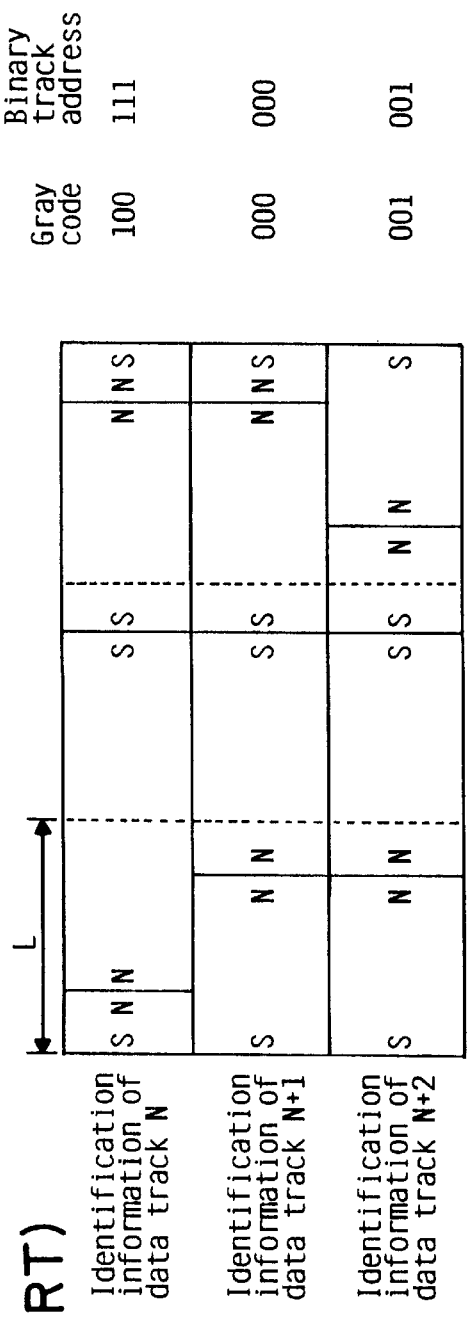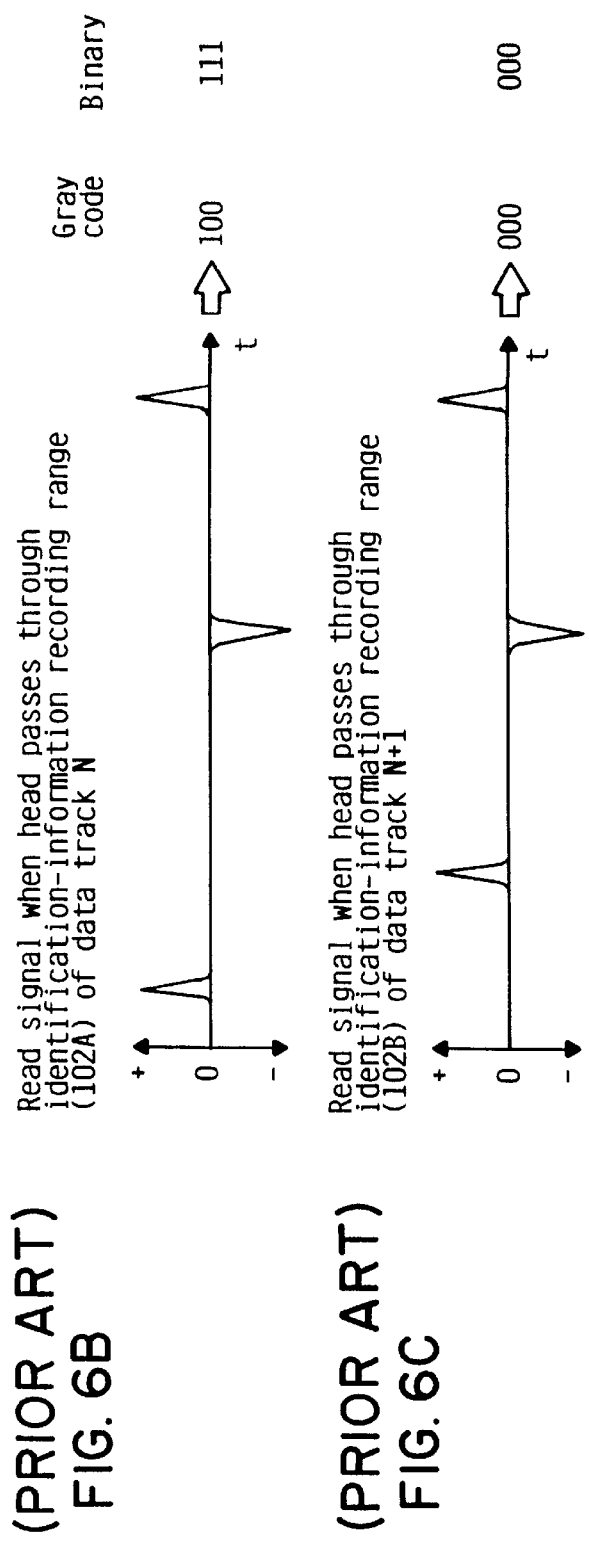
(PRIOR ART) FIG. 6A
(PRIOR ART) FIG. 6B
(PRIOR ART) FIG. 6C

METHOD AND APPARATUS FOR INDICATING START OF SERVO INFORMATION ON A RECORDING MEDIUM

FIELD OF THE INVENTION

The present invention relates generally to a servo pattern and a servo-information identification method for a disk drive apparatus, particularly to a servo pattern and a reading method for preventing an error in reading servo-information identification information for detecting a head position on a disk.

BACKGROUND OF THE INVENTION

Data tracks are concentrically formed on a magnetic disk such as a hard disk. Data is read from or written onto a magnetic disk by rotating the magnetic disk and moving a magnetic head in a radius direction of the magnetic disk to position the magnetic head at a certain data track (so called seeking). The magnetic head is positioned at a certain data track after the magnetic head reads head-position identification information and a burst pattern previously recorded on the magnetic disk as described below.

A data area and a servo area are formed separately on a disk. As shown in FIG. 7, for example, data areas 81 and servo areas 88 are formed on a disk and a magnetic head recognizes their positions on the disk in accordance with servo data recorded in these servo areas 88 and writes or reads data in or from a data area at a desired position.

FIG. 8 shows a conventional servo pattern in a servo area. A write recovery pad 82 is formed at a position next to a data and error correction code (ECC) area 81 on a disk. The write recovery pad 82 is formed to secure an adjustment time for change of a write mode to a read mode. While a head passes through the area, a read amplifier and an automatic gain control (AGC) are adjusted and set to the normal read operation executing state.

An erase area 83 which is a silent interval serving as a servo Identification (ID) indicating a start position of servo information is formed next to the write recovery area and a gray code 84, having cylinder (CYL) and sector (SEC) position information at the present track position, is formed next to the erase area. A servo wedge 85 comprising a burst pattern for providing a fine-adjustment signal for positioning a head position with respect to a track is recorded next to the gray code. By reading these servo data, the magnetic head is positioned at a desired track.

FIG. 5 shows a part of head-position identification information and part of a burst pattern recorded on a magnetic disk. In FIG. 5, the magnetic disk rotates in the circumferential direction (direction shown by the arrow F in FIG. 5) and a magnetic head (not shown) moves in a radius direction of the magnetic disk (direction shown by the arrow G in FIG. 5). A plurality of data tracks 100A, 100B, 100C . . . in which data is recorded are concentrically formed on the magnetic disk. Data tracks are separated from each other in the circumferential direction and an identification-information recording area 102 and a burst-pattern recording area 104 are formed between the adjacent data tracks.

Each data track is previously provided with a track address for identifying itself. Identification information, comprising a predetermined number of bits in which the track address of each data track is indicated by a gray code (cyclic binary code), is recorded in the identification-information recording area 102 in the circumferential direction correspondingly a respective data track. Moreover, a plurality of burst pattern strings 106A, 106B, 106C, and 106D (four strings in the case of FIG. 5) are formed in a burst pattern area 104. These plural burst pattern strings (shown by hatching in FIG. 5) are arranged on the disk so that the strings have predetermined phase shift to each other.

To position a magnetic head at a desired data track, it is necessary to rotate a magnetic disk and move the magnetic head approximately in a radius direction of the magnetic disk as described above. It is also necessary to compute the track address of a data track to which the magnetic head is opposed as the present position of the magnetic head in accordance with an identification-information read signal outputted from the magnetic head, whenever the identification-information recording area 102 is opposed to the magnetic head as the magnetic disk rotates. Identification information, as shown in FIG. 6(A) more minutely, is recorded so that the position of a portion magnetized to N. or S. in the recording range of a one-bit-data recording length (L in FIG. 6(A)) corresponding to each bit of a gray code showing a track address in accordance with the fact that the value of each bit of the gray code is set to "0" or "1" because the length L is previously determined.

For example, when a magnetic head passes through an identification-information recording area 102A of a data track N shown in FIG. 6), a pulse is generated as an identification-information read signal at a portion magnetized to N. or S. as shown in FIG. 6(B) and a signal corresponding to the pulse is outputted from the magnetic head. Moreover, when the magnetic head passes through an identification-information recording area 102B of a data track N+1 shown in FIG. 6), a pulse is generated as an identification-information read signal at a portion magnetized to N. or S. as shown in FIG. 6(C) and a signal corresponding to the pulse is outputted from the magnetic head. Therefore, it is possible to distinguish the value of a gray code serving as the identification information recorded in the identification-information recording area 102 in accordance with the positions of the pulses of the identification-information read signals. Further, it is also possible to obtain a track address by converting the distinguished gray code to a binary code.

A gray code (100) is read from the pulse in FIG. 6(B) and a converted binary code (111) is obtained, while a gray code (000) is read from the pulse in FIG. 6(C) and a converted binary code (000) is obtained.

When it is judged that the magnetic head opposed to a target data track, a position detection signal whose level is linearly changed in accordance with the position of the magnetic head is generated in accordance with a plurality of signals obtained by reading a plurality of burst pattern strings in the burst-pattern recording area 104 by the magnetic head and the magnetic head is positioned so that the center of a gap of the magnetic head is located at the cross-directional center of the purposed data track in accordance with the position detection signal.

As the data storage capacity of a magnetic disk increases, a lot of measures are taken for medium defects, electrical noises, and read errors. An error occurring in a data area is generally corrected by adding a signal having an error correcting function such as an ECC. However, measures are not adequately taken for errors generated in a servo area. If an ECC is added to the servo area as in the case of user data, the coding overhead increases and this is disadvantageous to increase the capacity of a magnetic disk.

On the other hand, the number of errors can be decreased by extending the servo area and reiteratively writing servo information in the area in duplicate. However, this method cannot achieve an effective error correcting function if errors occur in consecutive areas. Further, this method increases the coding overhead.

Therefore a need exists for a servo pattern which makes it possible to prevent read errors in servo information and obtain accurate servo information. In addition, a need exists for a servo pattern which makes it possible to accurately read a servo-information start position and an information recording apparatus which makes it possible to accurately read servo information. Also, a need exists for an data recording apparatus which makes it possible to avoid unnecessary seeking or repositioning by not judging an error generated in reading servo information for providing track position information as an error but judging that a track is located at an accurate position when the error meets a predetermined condition.

The present invention provides a solution to these and other problems, and offers other advantages over the prior art.

SUMMARY OF THE INVENTION

In accordance with one embodiment of the present invention, a disk drive apparatus for rotating a disk to read data recorded on a track of the disk or write data on a track of the disk by a signal transducer head positioned on the disk is provided. The disk has servo information recorded on the disk for identifying a track position. In addition, the disk also has a servo start mark for identifying a servo-information start position. This servo start mark preferably has a plurality of bit patterns substantially unused for other areas in the servo information. By way of example, the disk drive includes two consecutive 3-bit patterns (111) and (000) which are used for the servo start mark.

The present invention also can be implemented as a servo-information identification method for a disk drive apparatus which rotates a signal recording disk to read or write data on a track of the disk by a signal transducer head positioned on the disk by using servo information recorded on the disk. This method includes steps of comparing an expected servo-information bit pattern with a read servo-information bit pattern, and deciding that the signal transducer head is positioned at the desired track position even when the read servo-information comprises one bit error against the expected servo-information bit pattern when the following conditions (a) and (b) are satisfied. Condition (a) is when a parity error occurs in said read servo-information bit pattern. Condition (b) is when the read servo-information does not coincide with servo information representing an adjacent cylinder. In a preferred embodiment servo-information identification method, the servo-information bit pattern is represented by a gray code for identifying a cylinder position on a disk.

These and various other features as well as advantages which characterize the present invention will be apparent upon reading of the following detailed description and review of the associated drawings.

BRIEF DESCRIPTION OF THE DRAWINGS

FIGS. 6(A)–(C) are an illustration for explaining a gray code of a prior art magnetic disk.

DETAILED DESCRIPTION

The servo pattern described in a preferred embodiment of the present invention makes it possible to accurately identify a servo-area start position even if a noise such as thermal asperity (TA) occurs and therefore to improve the reliability for head position control.

The servo-signal reading method described in a preferred embodiment of the present invention makes it possible to avoid unnecessary seeking or repositioning. According to this invention, even if an error occurs in a servo information reading operation, it is decided that an accurate position is detected when a predetermined condition is satisfied. Therefore, the data processing efficiency can be improved.

Embodiments of the present invention are described below by referring to the accompanying drawings.

Figure 1:
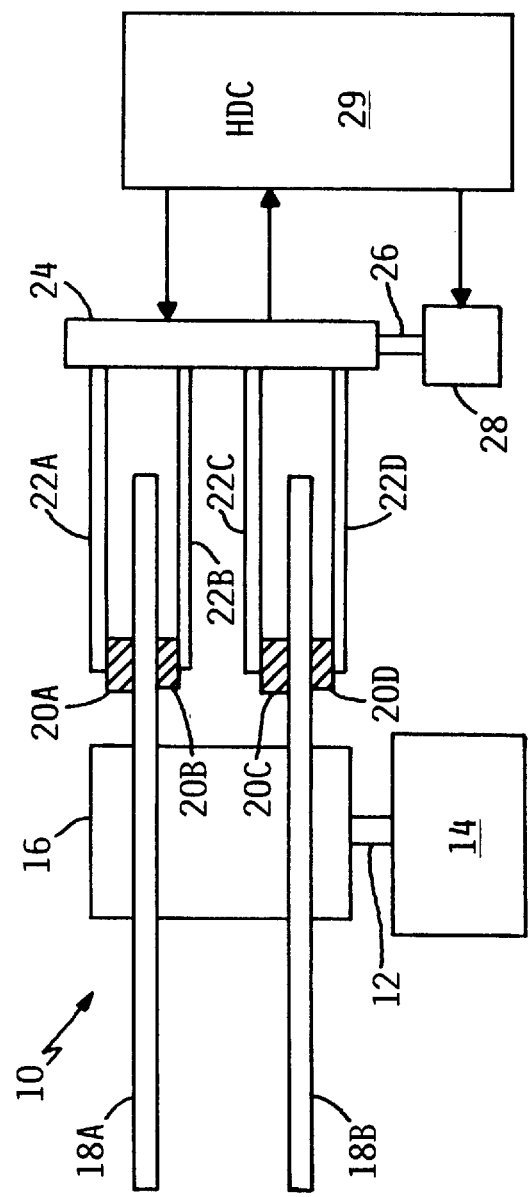
FIG. 1 is a block diagram of the magnetic disk memory of an embodiment of the present invention.

As shown in FIG. 1, the HDD 10 of the preferred embodiment comprises a disk 18 and a hard disk controller (hereafter referred to as an HDC) 29 as shown in FIG. 1.

A disk section is provided with a disk drive 14 for rotating a shaft 12 at a high speed. The shaft 12 is provided with a cylindrical support 16 so that the axis of the shaft 12 is aligned with that of the support 16 and the outer periphery of the support 16 is provided with information recording disks 18A and 18B. Magnetic heads 20A, 20B, 20C, and 20D are set so as to face each disk surface and supported by access arms 22A, 22B, 22C, and 22D extending from a support section 24. Magnetic heads 20A to 20D are rotated about a shaft 26 by a driving force transferred from a magnetic-head drive 28 and moved to a desired position on the disk 18.

Figure 2:
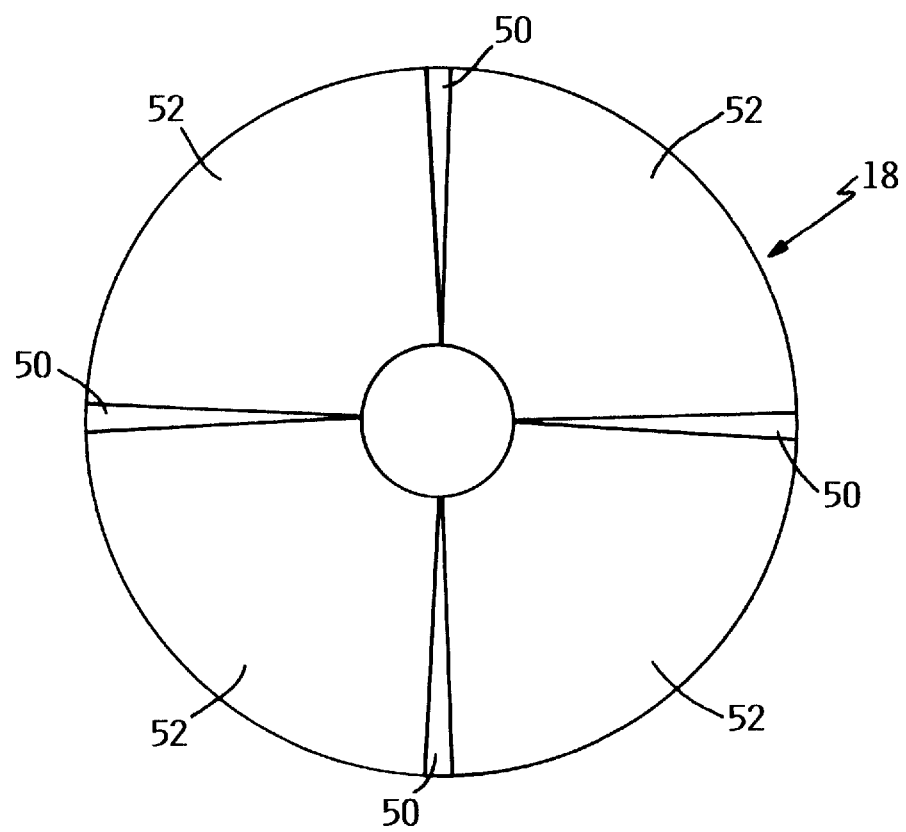
FIG. 2 is an illustration showing the magnetic disk of an embodiment of the present invention.

A data area 52 is formed on the surfaces of the disks 18A and 18B respectively as shown in FIG. 2 and a plurality of servo areas 50 are radially formed in these data areas. A gray code (cyclic binary code) showing the address of a data track is recorded in the servo area 50. A burst pattern for serving a signal for positioning the head on a track accurately is recorded in the area 50. Data tracks are formed at predetermined pitch P and a plurality pieces of data are recorded in the tracks together with a respective ID (Identification) representing identification information of each data.

Figure 3:
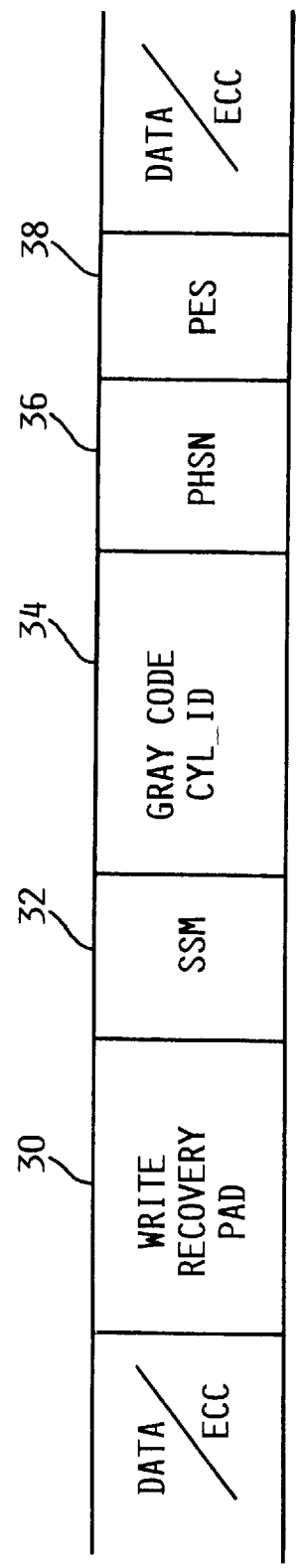
FIG. 3 is an illustration showing a signal structure on a track of the information recording medium of an embodiment of the present invention.

FIG. 3 shows a servo pattern of the preferred embodiment of the present invention. A substantial portion of actual servo area starts next to a write recovery area 30. The start position of the servo area is shown by a servo start mark (SSM) 32. A gray code area 34 is present next to the servo start mark 32, where a cylinder position is shown. A sector information area (PHSN: Physical Sector Number) 36 is present next to the gray code area 34. The sector information area 34 shows the present sector position. A PES (Position Error Signal) area 38 is present next to the sector information area 36. The PES signal shows a deviation of a head from the center of a track, which provides signal for positioning the head on the center of the track. Areas from SSM to PES constitute the servo area.

One of the features of the preferred embodiment of the present invention is a signal SSM showing a servo start position. The SSM 32 comprises, for example, 9 bits and has a bit pattern of "000100111". This bit pattern includes three consecutive bits of "111" and three consecutive bits of "000". Such a combination of bit patterns is not read out from other servo areas such as the gray code area 34, sector information area 36, and PES signal area 38. Therefore, confusion with the SSM signal does not occur in other servo areas. Moreover, even if a noise such as thermal asperity is generated, it is hardly considered that the very characteristic bit strings of "111" and "000" occur at predetermined intervals. Therefore, the structure of the preferred embodiment of the present invention makes it possible to effectively prevent a SSM read error. This is because the SSM structure includes a plurality of unique bit patterns which are not present in other servo areas.

The servo start mark structure of the present invention is not restricted to the above one. For example, it is possible to use a 7-bit structure of "0001110" including "000" and "111". Moreover, it is possible to use an 8-bit structure of "00001110" or "00010111". Any structure can be used as long as the structure includes a plurality of characteristic bit strings such as "000" and "111" in the number of predetermined-interval bits. The preferred embodiment servo-information read method of the present invention is described below in detail. One of the features of the servo read method is practiced in reading the gray code area 14. As described above, a gray code provides cylinder information. That is, the gray code shows the cylinder position at which the head is positioned. Each cylinder has an each unique cylinder ID comprised of a predetermined number of bits in a gray code. In general, a gray code is constituted so that one bit differs between adjacent cylinders. Thus, gray code bit values differ one by one as a cylinder moves sequentially to outer or inner tracks in order.

A gray code of an embodiment of the present invention comprises a plurality of bits representing the gray code plus one parity bit. When an error occurs in reading gray codes of the present invention, that is, when a gray code of a cylinder other than an expected cylinder is read, the following steps are performed. At first, whether the error is a one-bit error or not is decided. If the error is a one bit error, following steps (a) and (b) are executed: Step (a) It is decided whether a parity error occurs. Step (b) It is decided whether the read gray code is a gray code showing an adjacent cylinder.

First, in step (a), if the error is two or more bit error, the error is regarded as a normal error and the position control is restarted. If the error is a one-bit error, it is decided in step (b) the read gray code is not a gray code representing an adjacent cylinder, which means the conditions (a), and (b) are satisfied, it is judged that the read gray code is a gray code present at the position of the expected cylinder. That error occurring in reading is ignored. Therefore, in this case, the conventional operation of seeking to re-read servo data is not performed.

Figure 4:
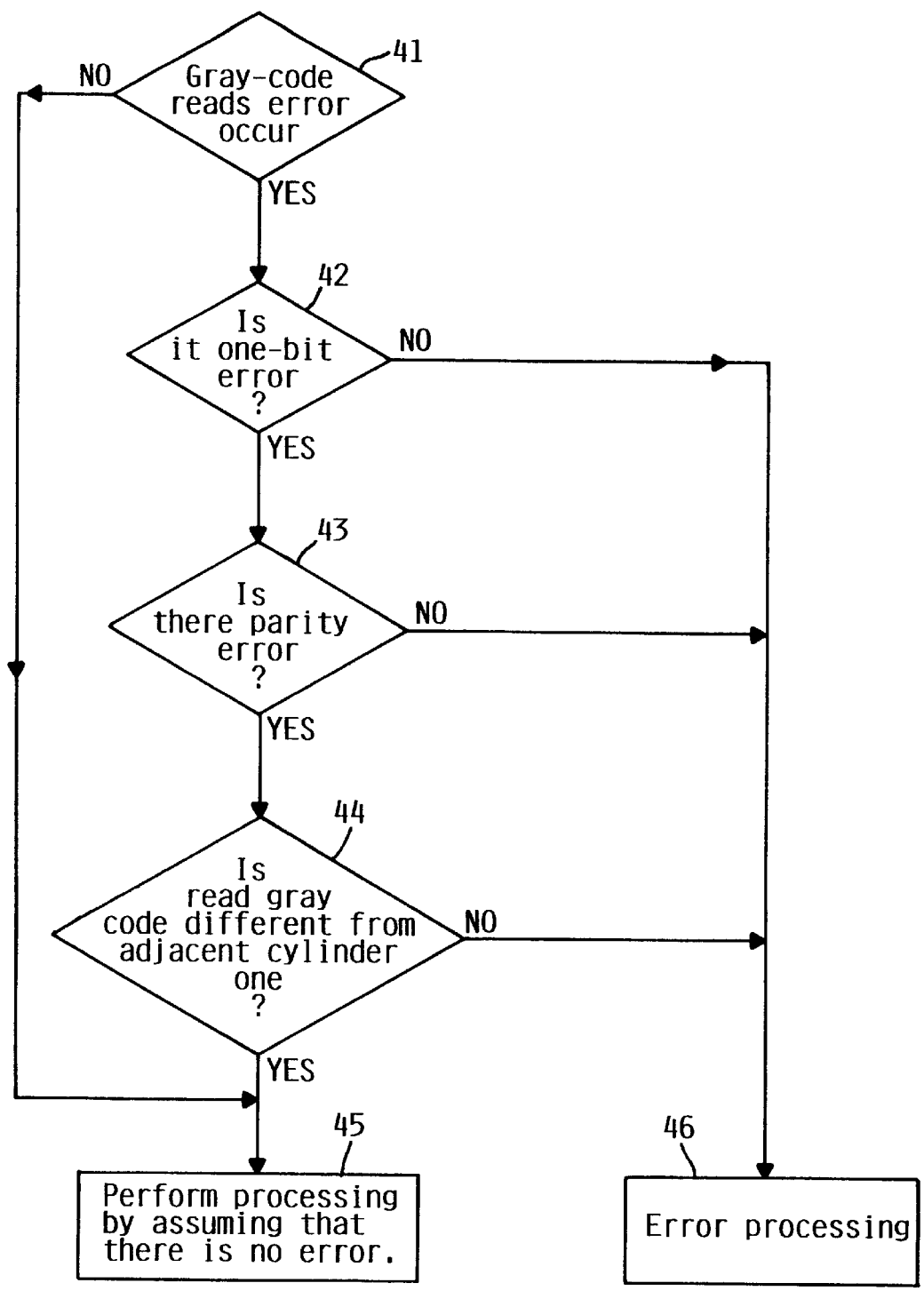
FIG. 4 is an illustration showing the servo-information read flow of an embodiment of the present invention.
Figure 5:
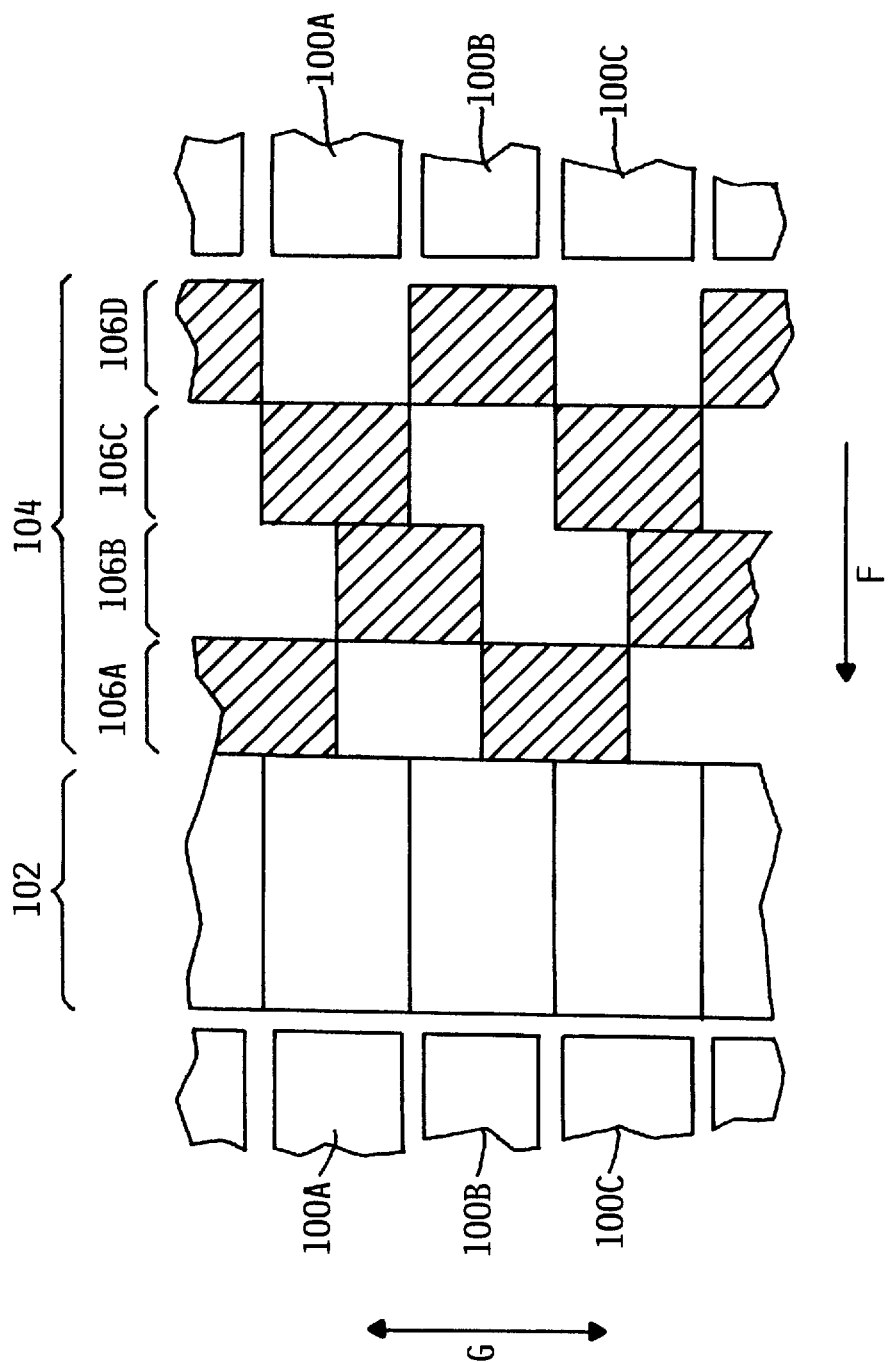
FIG. 5 is an illustration showing an identification-information recording area recorded in a prior art magnetic disk.
Figure 7:
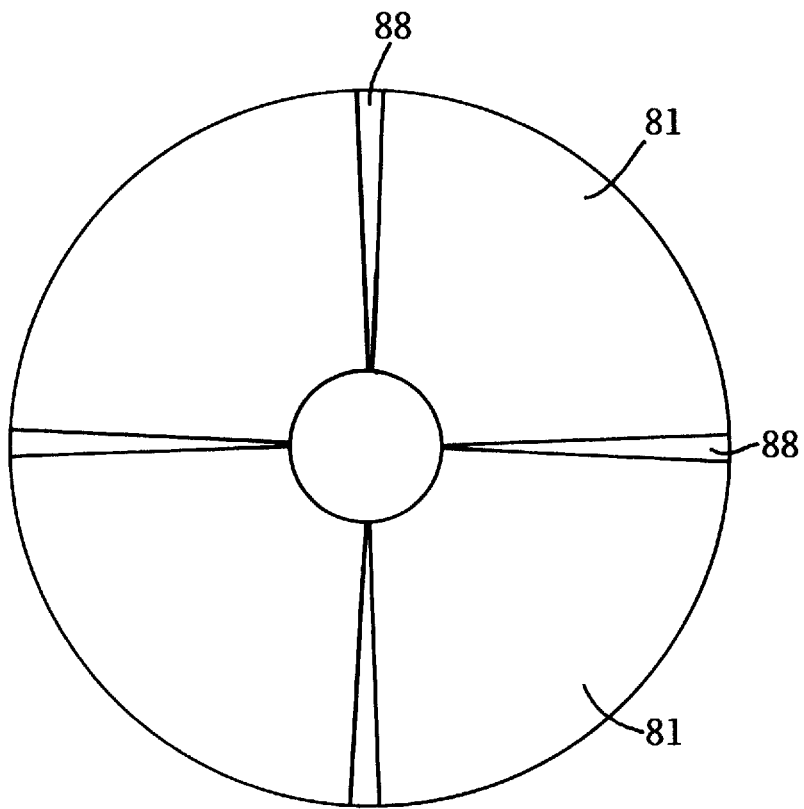
FIG. 7 is an illustration showing data areas and servo areas of a prior art magnetic disk.
Figure 8:
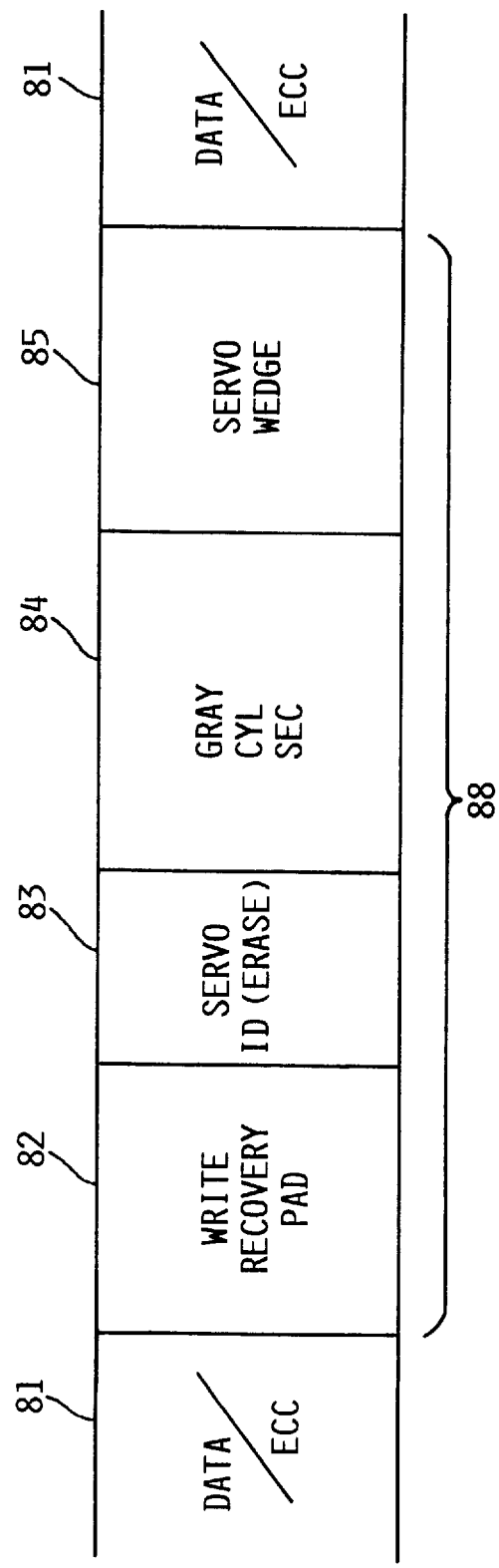
FIG. 8 is an illustration showing a track signal structure of the information recording medium of an conventional prior art embodiment.

FIG. 4 shows the above processing in a flowchart. In step 41, it is checked if an error has occurred when reading gray codes. If an error has occurred, it is checked in step 42 if the error is a one-bit error. In step 43, it is checked if a parity error has occurred, and it is checked in step 44 if the read gray code is different from that of an adjacent cylinder. When all these conditions are met, it is concluded that no error has occurred (step 45) and data read or write operation starts. Unless the conditions are satisfied, an error processing is performed (step 46). These decision steps are not restricted to the above processing sequence. It is possible to follow any sequence. It is also possible to perform judgments at the same time.

A case is described below in which specific bit strings of gray codes are prepared for cylinder 99 to cylinder 101.

| Cylinder | 99:  | 000001010010:0 (Parity) |
| Cylinder | 100: | 000001010110:1 (Parity) |
| Cylinder | 101: | 000001010111:0 (Parity) |

First, it is assumed that a read gray code is different from a gray code of the cylinder 100 as shown below. There are errors at second and third bit positions.

| Cylinder | 100: | 000001010110:1 (Parity) |
| Read data | : | 011001010110:1 (Parity) |

That is, two or more bits errors have been found. In this case, the decision in step 42 of FIG. 4 is negative and therefore a process for an error starts. That is, it is judged that a head may not securely be located at the position of the desired cylinder.

When the following gray code is read, only one error is present at the fifth bit position of the read gray code and the parity shows a correct value for the read gray code.

| Cylinder | 100: | 000001010110:1 (Parity) |
| Read data | : | 000011010110:0 (Parity) |

The above read gray code corresponds to that of a cylinder 155 and the parity value also coincides with that of the cylinder 155. In this case, it is decided that an actual head is located at the cylinder 155. That is, the decision made in step 43 of FIG. 4 is negative and a process for an error is therefore performed by assuming that the head is not located at the desired cylinder 100.

When the following gray code is read, an error is present at the fifth bit position and the gray code of the cylinder 155 is shown similarly to the above case.

| Cylinder | 100: | 000001010110:1 (Parity) |
| Read data | : | 000011010110:1 (Parity) |

In this case, the parity value shows the error. Therefore, every decision step results are positive in steps 42, 43, and 44. In this case, the error is merely attributable to noises and so on and it is not regarded as a positioning error. It is therefore judged that the head is positioned at the desired cylinder 100.

When the following gray code is read, the read gray code represents the cylinder 99, and the read parity is 0 or 1.

| Cylinder | 100: | 000001010110:1 (Parity) |
| Read data | : | 000001010010:0 or 1 (Parity) |

Though the cylinder 100 should have been read, it is considered that the head is actually located at the cylinder 99 because the head may be moved to an adjacent cylinder due to a disturbance such as a physical shock. Therefore, when the read gray code represents a cylinder adjacent to a target one, it is regarded as an error, irrespective of a parity value, by assuming that the head is located at an adjacent cylinder. That is, this is a case in which decision is negative in step 44 of FIG. 4.

As described above, the present invention makes it possible to decrease the number of errors in reading servo information. Therefore, the frequency of head repositioning processes is decreased. Thus the reliability and the efficiency of head positioning are improved.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. In a system for storing data on an information recording medium having data tracks concentrically formed thereon which positions a signal transducer head to read or write signals on said data track by utilizing track position information recorded on said information recording medium in servo regions, the servo regions comprising a servo start mark for identifying a servo-information start position recorded therein, said servo start mark comprising a plurality of bit pattern strings substantially unused for other areas in said servo regions, a method for identifying servo-information comprising steps of:

(a) comparing an expected servo-information bit pattern with a read servo-information bit pattern; and (b) deciding that said signal transducer head is positioned at a particular track position even when said read servo-information bit pattern differs by a one bit error from said expected servo-information bit pattern when conditions (i) and (ii) are satisfied, (i) a parity error occurs in said read servo-information bit pattern, and (ii) said read servo-information bit pattern does not coincide with track position information representing an adjacent cylinder.

2. The method of claim 1 wherein said servo-information bit pattern is represented by a gray code for identifying a cylinder position on the information recording medium.

* * * * *